United States Patent
Wang

(10) Patent No.: US 12,488,858 B2
(45) Date of Patent: Dec. 2, 2025

(54) METHOD AND CIRCUITRY FOR HANDLING DEFECTIVE MEMORY CELLS AND WORDLINES IN MEMORY MODULE

(71) Applicant: PieceMakers Technology, Inc., Hsinchu (TW)

(72) Inventor: Ming-Hung Wang, Hsinchu (TW)

(73) Assignee: PieceMakers Technology, Inc., Hsinchu (TW)

( * ) Notice: Subject to any disclaimer, the term of this patent is extended or adjusted under 35 U.S.C. 154(b) by 120 days.

(21) Appl. No.: 18/404,853

(22) Filed: Jan. 4, 2024

(65) Prior Publication Data
US 2025/0226052 A1 Jul. 10, 2025

(51) Int. Cl.
*G11C 29/00* (2006.01)
*G11C 8/10* (2006.01)

(52) U.S. Cl.
CPC .............. *G11C 29/789* (2013.01); *G11C 8/10* (2013.01); *G11C 29/76* (2013.01); *G11C 29/808* (2013.01)

(58) Field of Classification Search
CPC .......... G11C 29/789; G11C 8/10; G11C 29/76
USPC ................................................... 365/185.09
See application file for complete search history.

(56) References Cited

U.S. PATENT DOCUMENTS

| | | | | |
|---|---|---|---|---|
| 6,130,853 A * | 10/2000 | Wang | .................. | G11C 7/1072 |
| | | | | 365/233.13 |
| 6,201,745 B1 * | 3/2001 | Ryu | ..................... | G11C 29/842 |
| | | | | 365/230.06 |
| 6,426,908 B1 * | 7/2002 | Hidaka | ..................... | G11C 5/14 |
| | | | | 365/222 |
| 6,614,675 B1 * | 9/2003 | Price | ...................... | G11C 15/00 |
| | | | | 711/108 |
| 10,468,076 B1 * | 11/2019 | He | ..................... | G11C 11/40615 |
| 2002/0021604 A1 | 2/2002 | Stender | | |
| 2004/0047192 A1 * | 3/2004 | Haga | ..................... | G11C 29/838 |
| | | | | 365/189.05 |
| 2005/0071723 A1 * | 3/2005 | Luick | .................. | G06F 11/1032 |
| | | | | 714/747 |
| 2007/0097761 A1 * | 5/2007 | Sunaga | ................ | G11C 29/806 |
| | | | | 365/200 |
| 2020/0051659 A1 | 2/2020 | Matsubara | | |
| 2023/0377672 A1 * | 11/2023 | Cho | ........ | G11C 29/42 |
| 2024/0379183 A1 * | 11/2024 | Lee | ....................... | G11C 29/021 |

FOREIGN PATENT DOCUMENTS

TW    I326880    7/2010

* cited by examiner

*Primary Examiner* — Ly D Pham
(74) *Attorney, Agent, or Firm* — Winston Hsu

(57) ABSTRACT

A method for handling defective regular local wordlines in a memory module is provided. The method includes: providing one or more sets of spare local wordlines; utilizing a spare control logic to generate a plurality of match signals by comparing an input address with a plurality of fail addresses; utilizing the spare control logic to generate at least one assignable bit according to the plurality of match signals; utilizing a local wordline pre-decoder to generate a local wordline activation signal according to one of at least one bit of the input address and the at least one assignable bit; and in accordance with the input address and the local wordline activation signal, utilizing the one or more spare wordline decoders to activate one spare local wordline from the one or more sets of spare local wordlines for repairing/replacing a defective regular local wordline.

18 Claims, 6 Drawing Sheets

METHOD AND CIRCUITRY FOR HANDLING DEFECTIVE MEMORY CELLS AND WORDLINES IN MEMORY MODULE

BACKGROUND OF THE INVENTION

1. Field of the Invention

The present invention relates to memory devices, and more particular, to a method and a circuitry for handling defective memory cells and wordlines of a memory module.

2. Description of the Prior Art

A semiconductor memory device (e.g., dynamic random access memory (DRAM)), may malfunction when there is defect over a memory cell array in the semiconductor memory device, which may interrupt data read-out or write-in operations on the memory device. For this reason, it is known to repair/replace defective memory cells on regular wordlines of the memory device with additional spare memory cells on built-in spare wordlines, thereby increasing the reliability of the memory device. When one or more memory cells are detected as defective by a test process in a wafer state, a wordline that the one or more defective memory cells are coupled to is repaired/replaced with a spare wordline that spare memory cells are coupled to, thereby allowing the memory device to be used even though it has some defective cells. However, as density of memory cells in the memory device increases, management on defective wordlines repairing/replacement would become considerably more complex. Therefore, there is a need of providing an innovative mechanism of defective wordlines repairing/replacement.

SUMMARY OF THE INVENTION

With this in mind, it is one object of the present invention to provide a method and a circuitry of handling defective wordlines. Embodiments of the present invention allow a given spare local wordline to repair/replace regular local wordlines that are indicated by any input address. In the present invention, through address bit assignment, a spare local wordline and a regular local wordline that is intended to be repaired/replaced could correspond to different lower address bits, which significantly improve the flexibility of defective wordline repairing/replacement.

According to one embodiment, a method for handling defective regular local wordlines in a memory module is provided. The method comprises: providing one or more sets of spare local wordlines; utilizing a spare control logic to generate a plurality of match signals by comparing an input address with a plurality of fail addresses; utilizing the spare control logic to generate at least one assignable bit according to the plurality of match signals; utilizing a local wordline pre-decoder to generate a local wordline activation signal according to one of at least one bit of the input address and the at least one assignable bit; and in accordance with the input address and the local wordline activation signal, utilizing the one or more spare wordline decoders to activate one spare local wordline from the one or more sets of spare local wordlines for repairing/replacing a defective regular local wordline.

According to one embodiment, a circuitry for handling defective regular local wordlines in a memory module is provided. The circuitry comprises: one or more spare local wordline decoders, a spare control logic, and a local wordline pre-decoder. The one or more spare local wordline decoders is configured to control one or more sets of spare local wordlines, each configured to selectively activate one spare local wordline of a corresponding set of spare local wordlines in accordance a local wordline activation signal and an input address, thereby to repair/replace a defective regular local wordline. The spare control logic is coupled to the one or more spare local wordline decoders, and configured to generate a plurality of match signals by comparing the input address with a plurality of fail addresses, and accordingly generate at least one assignable bit according to the plurality of match signals. The local wordline pre-decoder is coupled to the spare control logic, and configured to generate the local wordline activation signal according to one of at least one bit of the input address and the at least one assignable bit.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Please note that, the present invention will be discussed below with reference to a dynamic random access memory (DRAM), but it also extends to other types of semiconductor memory devices, such as SRAMs, ROMS, EPROMs, EEPROMS, Flash RAMS, FRAMs, CAMs, and the like.

Figure 1:
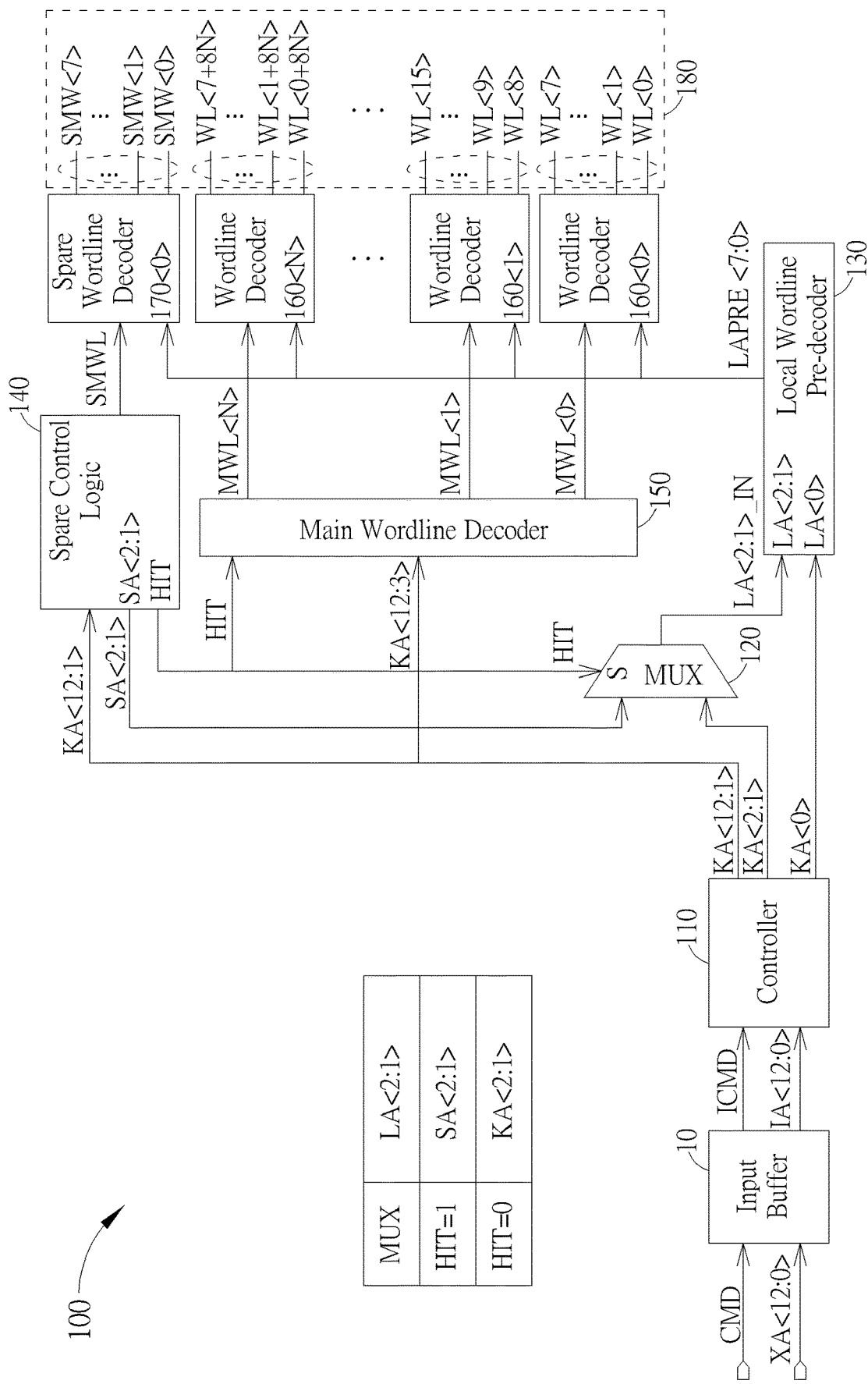
FIG. 1 illustrates a schematic diagram of a memory module according to a first embodiment of the present invention.

FIG. 1 illustrates a schematic diagram of a memory module according to a first embodiment of the present invention. As shown by FIG. 1, a memory module 100, which can be a DRAM memory module, and/or belongs to a memory bank of a multi-bank memory device, comprises an input buffer 10, a controller 110, a multiplexer 120, a local wordline pre-decoder 130, a spare control logic 140, a main wordline decoder 150, a plurality of wordline decoders 160<0>-160<N>, one or more spare wordline decoders 170<0>-170<M> and a memory cell array 180. For sake of brevity, there is only one spare wordline decoder 170<0> is illustrated and mentioned in the following descriptions. However, this is not a limitation of the present invention. According to various embodiments, there would be more than one spare wordline decoders in the memory module of the present invention.

The memory cell array 180 comprises a plurality of regular and spare memory cells (not shown), which are coupled to and controllable by a plurality of regular local wordlines WL<0>-WL<7+8N> and a plurality of spare wordlines SWL<0>-SWL<7>, respectively. In this embodiment, every eight regular local wordlines are grouped as a set of regular local wordlines and controlled by one of wordline decoders 160<0>-160<N>, while every eight spare local wordlines are grouped as a set of spare local wordlines and controlled by one of spare wordline decoders 170<0>-170<M>. For example, the wordline decoders 160<0> is configured to control the set of regular local wordlines WL<0>-WL<7> and activate one regular local wordline thereof in response to an input address, the wordline decoders 160<1> is configured to control the set of regular wordlines WL<8>-WL<15> and activate one regular local wordline thereof in response to an input address, . . . , the wordline decoders 160<N> is configured to control the set of regular local wordlines WL<0+8N>-WL<7+8N> and activate one regular local wordline thereof in response to an input address. Additionally, the spare wordline decoders 170<0> is configured to control the set of spare local wordlines SWL<0>-SWL<7> and activate one spare local wordline thereof. Please note that, the number of spare local wordlines that are included in one set of spare local wordlines and controllable by one spare wordline decoder, the number of regular local wordlines that are included in one set of regular local wordlines and controllable by one wordline decoder are all not limitations of the present invention, and these numbers may be different in other embodiments of the present invention.

The input buffer 10 receives a write or read command CMD and an external address XA<12:0> sent by a host device (e.g. a memory controller which is not shown in figure) for requesting an access to the memory module 100. The input buffer 10 accordingly outputs an internal command ICMD and an internal address IA<12:0>. The controller 15 outputs an address bit KA<0> of an input address KA<12:0> to the local wordline pre-decoder 130, address bits KA<2:1> of the input address KA<12:0> to the multiplexer 120, address bits KA<12:3> of the input address KA<12:0> to the main wordline decoder 150, and address bits KA<12:1> of the input address KA<12:0> to the spare control logic 140. Specifically, the controller 110 would output the input address KA<12:0> according to the external address XA<12:0> (i.e., the internal address IA<12:0>) or a refresh address. The refresh address could be determined by an auto-refresh algorithm executed by the controller 110, which is utilized to perform an auto-refresh operation on memory cell array 180 for the purpose of data retention/maintenance. Please note that, the number of bits of an address mentioned in this embodiment is just for illustrative purpose rather than limitations.

Typically, the main wordline decoder 150 is configured to receive and decode the address bits KA<12:3>, and accordingly outputs regular main wordline signals MWL<0>-MWL<N> (, only one of which will be active) to activate one of the wordline decoders 160<0>-160<N>. The activated one of the wordline decoders 160<0>-160<N> would further activate one of the set of regular local wordlines that are controlled by the local wordline activation signals (i.e. LAPRE<7:0>). However, if the input address KA<12:0> is directed to a row address of a defective regular local wordline, things will be different.

Figure 2:
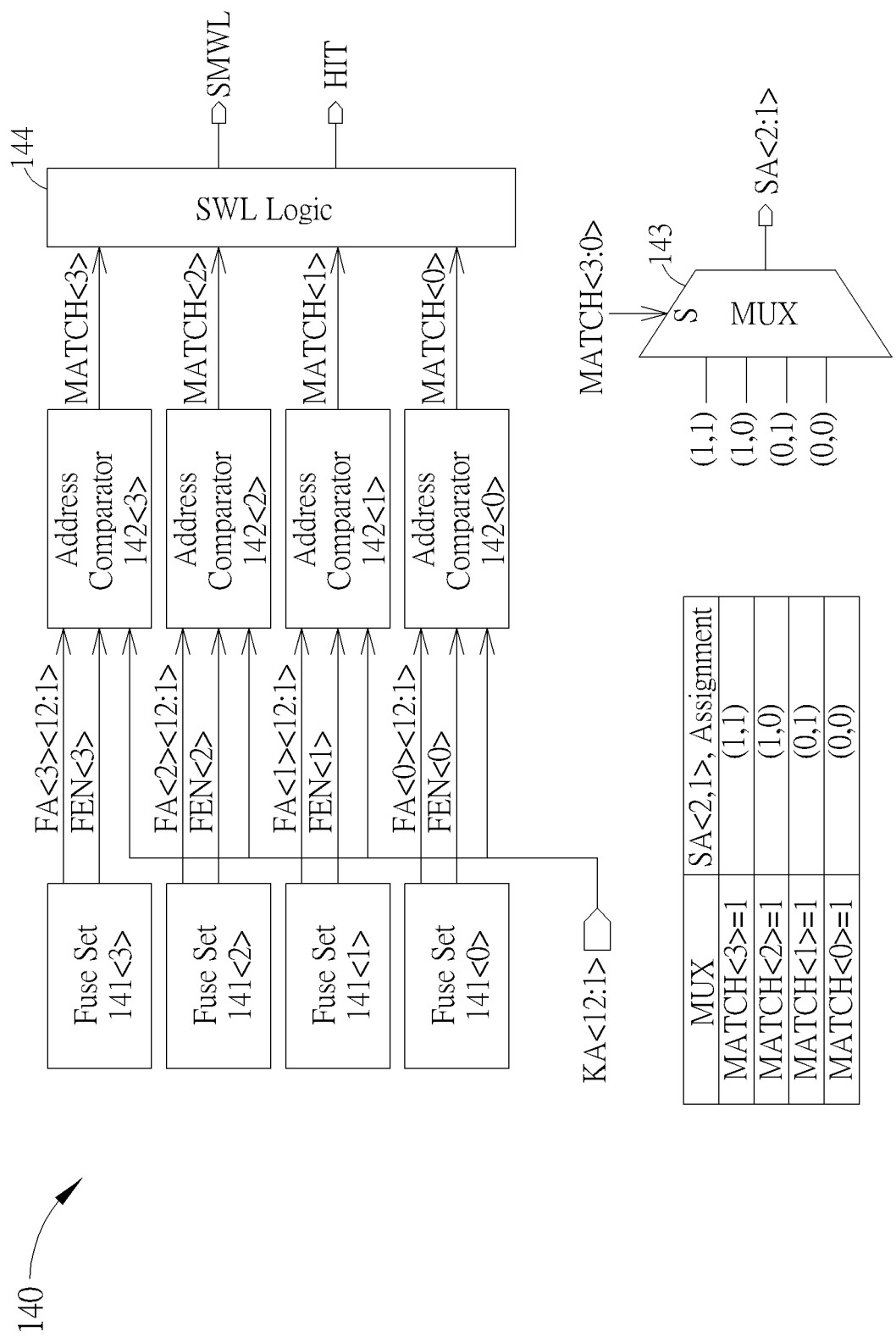
FIG. 2 illustrates a schematic diagram of a spare control logic of the memory module according to the first embodiment of the present invention.

Please refer to FIG. 2, which illustrates a schematic diagram of the spare control logic 140 according to one embodiment of the present invention. The spare control logic 140 is configured to determine whether the instant input address KA<12:0> is directed to a row address of a defective regular local wordline that has been set to be repaired/replaced by one of the spare local wordlines. If so, the main wordline decoder 150 will be disabled. Specifically, the spare control logic 140 generates assignable bits SA<2:1> (whose value are assigned by the spare control logic 140) as one of inputs of the multiplexer 120 and a hit signal HIT for controlling the multiplexer 120. The hit signal HIT will be active if the address bits KA<12:1> of the input address KA<12:0> are directed to the row address of the defective regular local wordline that is repaired/replaced by one spare local wordline. Therefore, the main wordline decoder 150 will be disabled if the hit signal HIT is active. Moreover, the spare control logic 140 also generates the spare main wordline signal SMWL to activate the spare wordline decoder 170<0>. Once the spare control logic 140 determines to activate one spare local wordline for repairing/replacement, the hit signal HIT will allow the multiplexer 120 to select assignable bits SA<2:1> as its output. Otherwise, the hit signal HIT will allow the multiplexer 120 to select the KA<2:1> as its output, which leads to a regular local wordline identified by the instant input address KA<12:0> to be activated.

The spare control logic further 140 includes address comparators 142<0>-142<3>, which receives address bits KA<12:1> of the input address KA<12:0>, respectively. In addition, the spare control logic 140 includes fuse sets 141<0>-141<3>, which record row addresses of one or more defective ones of regular local wordlines WL<0>-WL<7+8N> that are found in a test process. The fuse sets 141<0> outputs an enablement signal FEN<0> and a fail address FA<0><12:1>, the fuse sets 141<1> outputs the an enablement signal FEN<1> and a fail address FA<1><12:1>, the fuse sets 141<2> outputs the an enablement signal FEN<2> and a fail address FA<2><12:1> and the fuse sets 141<3> outputs an enablement signal FEN<3> and a fail address FA<3><12:1>.

Each of the enablement signals FEN<0>, FEN<1>, FEN<2> and FEN<3> will be active if a corresponding one of the fuse sets 141<0>-141<3> records a row address of a found defective regular local wordline. Each of the fail addresses FA<0><12:1>, FA<1><12:1>, FA<2><12:1> and FA<3><12:1> is directed to a row address of a found defective regular local wordline that is recorded by a corresponding one of the fuse sets 141<0>-141<3>. Please note that the number of address comparators and the number of fuse sets are not a limitation of the present invention, and they may be dependent to each other.

Each of the address comparators 142<0>-142<3> will be selectively enabled by a corresponding to one of the enablement signals FEN<0>, FEN<1>, FEN<2> and FEN<3>, thereby to compare the fail addresses FA<0><12:1>, FA<1><12:1>, FA<2><12:1> and FA<3><12:1> with the address bits KA<12:1> of the input address KA<12:0>. If the address bits KA<12:1> of the input address KA<12:0> matches one of the fail addresses FA<0><12:1>, FA<1><12:1>, FA<2><12:1> and FA<3><12:1>, a corresponding one of match signals MATCH<0>-MATCH<3> will be active to indicate the match. For example, the match signal MATCH<3> will be active if the fail address FA<3><12:1> matches the address bits KA<12:1>, this means one of regular local wordlines that are indicated by the address bits KA<12:1> (, the address bits KA<12:1> could correspond two of the regular local wordlines) is defective and is intended to be repaired/replaced by a spare local wordline indicated by the fail address FA<3><12:1>.

Typically, the fail addresses of the defective regular local wordlines are stored using blown fuses. During in-house testing, the addresses of these defective wordlines, known as fail addresses, are programmed into one of one of fuse sets 141<0>-141<3> with plurality of fuses. Each fail address should be programmed into only one of these fuse sets 141<0>-141<3> to prevent more than one corresponding match signals MATCH<0>-MATCH<3>, from being active simultaneously. In other words, only one of the match signals MATCH<0>-MATCH<3> is permitted to be active at any given time.

A SWL logic 144 of the spare control logic 140 outputs the spare main wordline signal SMWL and the hit signal HIT according to the match signals MATCH<3>, MATCH<2>, MATCH<1> and MATCH<0>. The spare main wordline signal SMWL, which would be outputted to the spare wordline decoder 170<0> and could be a result of logical OR operation on the match signals MATCH<3>, MATCH<2>, MATCH<1> and MATCH<0>, is configured to activate the spare wordline decoder 170<0>. If any one of the match signals is active, this means one of spare local wordlines needs be activated for repairing/replacing the defective regular local wordline, and the spare wordline decoder 170<0> would be activated. Moreover, the hit signal HIT, which could be a result of logical OR operation on the match signals MATCH<3>, MATCH<2>, MATCH<1> and MATCH<0>, is configured to disable the main wordline decoder 150 when being active. This is because one of spare local wordlines has been activated for repairing/replacing the defective regular local wordline and the main wordline decoder 150 does not need to be activated.

According to the match signals MATCH<3>-MATCH<0>, the spare control logic 140 assign the assignable bits SA<2:1> as different values by using a multiplexer 143. Specifically, if the match signal MATCH<3> is active, the assignable bits SA<2:1> is assigned as (1, 1); if the match signal MATCH<2> is active, the assignable bits SA<2:1> is assigned as (1, 0); if the match signal MATCH<1> is active, the assignable bits SA<2:1> is assigned as (0, 1); and if the match signal MATCH<0> is active, the assignable bits SA<2:1> is assigned as (0, 0).

Please refer to FIG. 1 again. By outputting a local wordline activation signal LAPRE <7:0>, the local wordline pre-decoder 130 is configured to notify the wordline decoders 160<0>-160<N> of which one of a set of regular local wordlines (e.g. one of the 8 regular local wordlines that are activatable by one wordline decoder) needs to be activated, or notify the spare wordline decoder 170<0> of which one of a set of spare local wordlines (e.g. one of the 8 spare local wordlines that are activatable by one spare wordline decoder) needs to be activated. Specifically, each of the wordline decoders 160<0>-160<N> receives the local wordline activation signal LAPRE <7:0> and one of the regular main wordlines MWL<0>-MWL<1023>. One of the wordline decoders 160<0>-160<N> will be set activated based on a corresponding one of the regular main wordlines MWL<0>-MWL<1023> that is set active. Accordingly, the activated one of the wordline decoders 160<0>-160<N> will further be configured by the local wordline activation signal LAPRE <7:0>, to activate one of the set of regular local wordlines (e.g. 8 regular local wordlines).

Typically, the local wordline activation signal LAPRE <7:0> is a 8-bit signal and has patterns of (<10000000>, <01000000>, <00100000>, <00010000>, . . . or <00000001>). The logic "1" in the bit sequence of the local wordline activation signal LAPRE <7:0> could indicate which one of the set of regular local wordlines should be activated. Similarly, the activated one of the spare wordline decoders 170<0>-170<M> will further be configured by the local wordline activation signal LAPRE <7:0>, to activate one of the set of spare local wordlines (e.g. 8 spare local wordlines).

The local wordline activation signal LAPRE <7:0> is generated based on decoding address bits LA<2:1> and LA<0> in an order of (LA<2>, LA<1>, LA<0>). The address bit LA<0> will be identical to the last bit/the least significant bit (LSB) of the input address KA<12:0> (i.e., LA<0>=KA<0>=IA<0>=XA<0>). Depending on the multiplexer 120, the address bits LA<2:1> will be either identical to second last bit and third last bit of the input address KA<12:0> (i.e., LA<2:1>=KA<2:1>=IA<2:1>=XA<2:1>) if the regular local wordline indicated by the input address KA<12:0> is not defective (i.e. Hit=0), or identical to the assignable bits SA<2:1> (whose value are assigned according to match signals MATCH <3>, MATCH <2>, MATCH <1> and MATCH <0>) if the regular local wordline indicated by the input address KA<12:0> is defective (i.e. Hit=1). That is, if the hit signal HIT generated by the spare control logic 140 is active, the local wordline pre-decoder 130 will be configured to decode bits in order of (SA<2>, SA<1>, KA<0>) to generate the local wordline activation signal LAPRE <7:0>.

Figure 3:
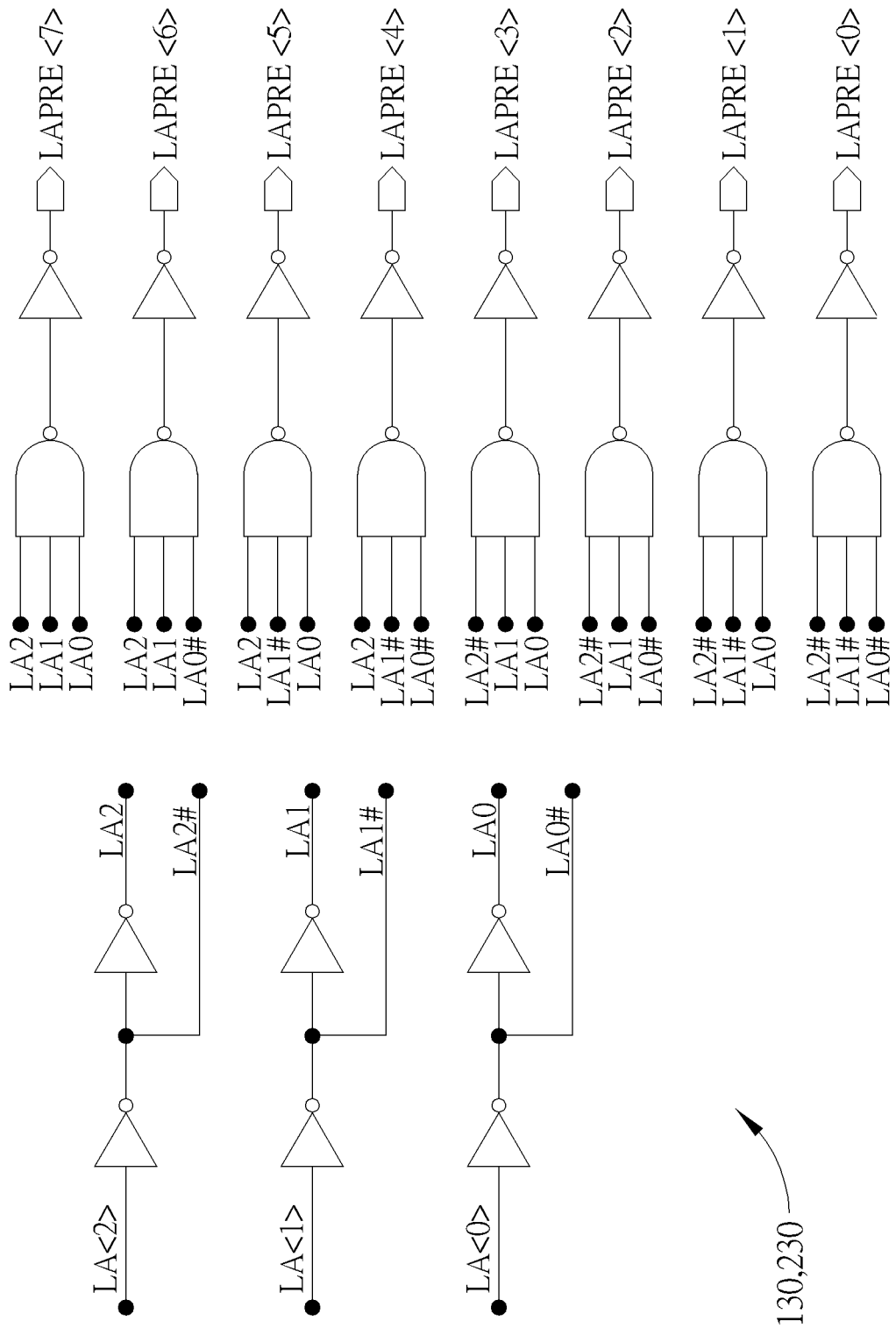
FIG. 3 illustrates a schematic diagram of a local wordline pre-decoder according to one embodiment of the present invention.

FIG. 3 illustrates a schematic diagram of the local wordline pre-decoder 130 according to one embodiment of the present invention. FIG. 3 explicitly depicts how the local wordline activation signal LAPRE <7:0> is generated based on address bits LA<2>, LA<1> and LA<0> through a combination of logic gates.

As can be seen by FIG. 2, if the assignable bits SA<2,1> is assigned as (0, 0), the spare local wordline SWL<0> or SWL<1> is allowed to be activated for repairing/replacing one of the regular local word wordlines that is indicated by the fail address FA<0><12:1>. If the assignable bits SA<2,1> is assigned as (0, 1), the spare local wordline SWL<2> or SWL<3> is allowed to be activated for repairing/replacing one of the regular local word wordlines that is indicated by the fail address FA<1><12:1>. If the assignable bits SA<2,1> is assigned as (1, 0), the spare local wordline SWL<4> or SWL<5> is allowed to be activated for repairing/replacing one of the regular local word wordlines that is indicated by the fail address FA<2><12:1>. If the assignable bits SA<2,1> is assigned as (1, 1), the spare local wordline SWL<6> or SWL<7> is allowed to be activated for repairing/replacing one of the regular local word wordlines that are indicated by the fail address FA<3><12:1>.

In view of above, it can be understood that the spare local wordlines SWL<0> and SWL<1> are operable to repair/replace any two of a set of regular local wordlines in their arrangement order. For example, the spare local wordline SWL<0> is operable to repair/replace one of the regular local wordlines WL<0>, WL<2>, WL<4> . . . or WL<6+8N> (that are directed to any address with LSB=0). The spare local wordline SWL<1> is operable to repair/replace one of the regular local wordline WL<1>, WL<3>, WL<5> . . . or WL<7+8N> (that are directed by any address with LSB=1). Similarly, the spare local wordlines SWL<2> and <3>, the spare local wordlines SWL<4> and <5> and the spare local wordlines SWL<6> and <7> are also operable to repair/replace any two of a set of regular local wordlines in their arrangement order. In other words, the spare local wordlines SWL<0> and SWL<1> are operable to repair/replace the regular local wordlines WL<0+2k> and WL<1+2k>, respectively, where k=0 to N. Similarly, the spare local wordlines pairs SWL<2> and SWL<3>, pairs SWL<4> and SWL<5> and pairs SWL<6> and SWL<7> are also operable to repair/replace the regular local wordlines WL<0+2k> and WL<1+2k>, respectively, where k=0 to N.

Figure 4:
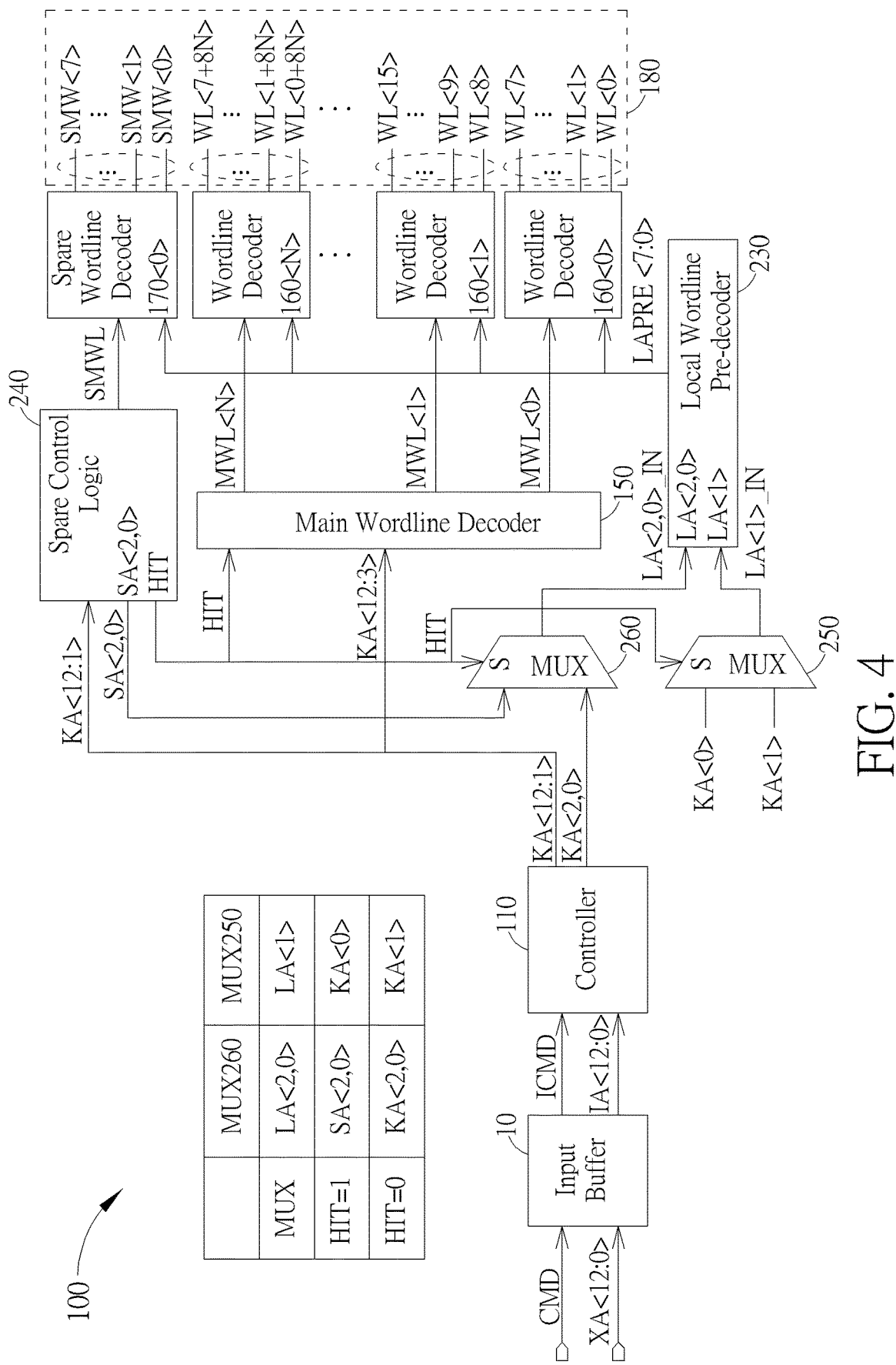
FIG. 4 illustrates a schematic diagram of a memory module according to a second embodiment of the present invention.
Figure 5:
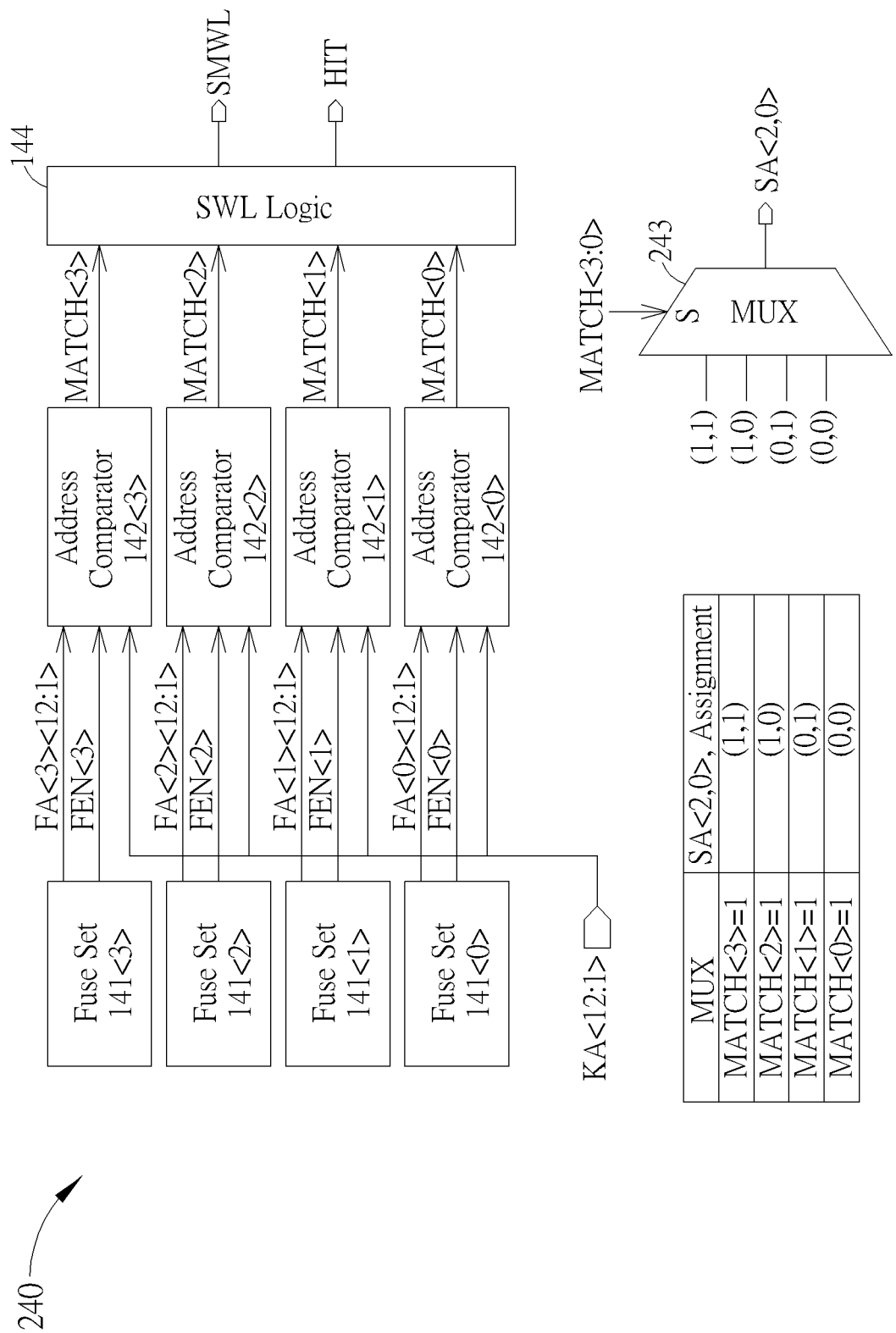
FIG. 5 illustrates a schematic diagram of a spare control logic of the memory module according to the second embodiment of the present invention.

Please refer to FIG. 4 in conjunction with FIG. 5, which illustrate a memory module according to a second embodiment of the preset invention. Please note that, some components in the embodiment shown by FIG. 4 and FIG. 5 are designated with same numberings of some components in the embodiment shown by FIG. 1 and FIG. 2, which means these components are same in their functions and operations, and will be omitted in the following descriptions for sake of brevity. The main difference between the first embodiment and the second embodiment is how to produce of the local wordline activation signal LAPRE <7:0>. In the second embodiment, the local wordline pre-decoder 230 (whose schematic diagram is illustrated in FIG. 3) generates the local wordline activation signal LAPRE <7:0> by decoding the address bits LA<1> and LA<2, 0>, both of which could be totally different from the address bits KA<1> and KA<2, 0> of the input address KA<12:0>.

Through a multiplexer 250, one of the inputs of the local wordline pre-decoder 230, i.e., the address bit LA<1>, could be identical to either the address bit KA<0> or address bit KA<1> of the input address KA<12:0>. If the hit signal HIT generated by the spare control logic 240 is active, the address bit LA<1> will be identical to the last bit/the LSB of the input address KA<12:0> (i.e., LA<1>=KA<0>=IA<0>=XA<0>). Otherwise, the address bit LA<1> will be identical to the second last bit of the input address KA<12:0> (i.e., LA<1>=KA<1>=IA<1>=XA<1>). In addition, through a multiplexer 260, one of the inputs of the local wordline pre-decoder 230, i.e., the address bits LA<2, 0>, could be identical to either the address bits KA<2, 0> the input address KA<12:0> or assignable bits SA<2, 0> that are generated by the spare control logic 240. If the hit signal HIT generated by the spare control logic 240 is active, the address bits LA<2, 0> will be identical to the assignable bits SA<2, 0>. Otherwise, the address bits LA<2, 0> will be identical to the third last bit and the last bit (LSB) of the input address KA<12:0> (i.e., LA<2, 0>=KA<2, 0>=IA<2, 0>=XA<2, 0>). That is, if the hit signal HIT generated by the spare control logic 240 is active, the local wordline pre-decoder 230 will be configured to decode bits in an order of (SA<2>, KA<0>, SA<0>) (i.e. LA<2>=SA<2>, LA<1>=KA<0>, LA<0>=SA<0>) to generate the local wordline activation signal LAPRE <7:0>.

Please refer to FIG. 5. As illustrated, the assignable bits SA<2,0> are determined according to the match signals MATCH<3>-MATCH<0>, the spare control logic 240 assign the assignable bits SA<2,0> as different values by using a multiplexer 243. Specifically, if the match signal MATCH<3> is active, the assignable bits SA<2,0> is assigned as (1, 1); if the match signal MATCH<2> is active, the assignable bits SA<2,0> is assigned as (1, 0); if the match signal MATCH<1> is active, the assignable bits SA<2,0> is assigned as (0, 1); and if the match signal MATCH<0> is active, the assignable bits SA<2,0> is assigned as (0, 0).

In view of above, if the assignable bits SA<2,0> is assigned as (0, 0), the spare local wordline SWL<0> or SWL<2> is allowed to be activated for repairing/replacing one of the regular local wordlines that is indicated by the fail address FA<0><12:1>. If the assignable bits SA<2,0> is assigned as (0, 1), the spare local wordline SWL<1> or SWL<3> is allowed to be activated for repairing/replacing one of the regular local wordlines that is indicated by the fail address FA<1><12:1>. If the assignable bits SA<2,0> is assigned as (1, 0), the spare local wordline SWL<4> or SWL<6> is allowed to be activated for repairing/replacing one of the regular local wordlines that is indicated by the fail address FA<2><12:1>. If the assignable bits SA<2,0> is assigned as (1, 1), the spare local wordline SWL<5> or SWL<7> is allowed to be activated for repairing/replacing one of the regular local word wordlines that is indicated by the fail address FA<3><12:1>.

In view of above, it can be understood that the spare local wordlines SWL<0 > and <2> are operable to repair/replace any two of a set of regular local wordlines in their arrangement order. For example, the spare local wordline SWL<0> is operable to repair/replace one of the regular local wordlines WL<0>, WL<2>, WL<4> . . . or WL<6+8N(that are directed to any address with LSB=0). The spare local wordline SWL<2> is operable to repair/replace one of the regular local wordlines WL<1>, WL<3>, WL<5> . . . or WL<7+8N> (that are directed by any address with LSB=1). Similarly, the spare local wordlines SWL<1> and <3>, the spare local wordlines SWL<4> and <6> and the spare local wordlines SWL<5> and <7> are also operable to repair/replace any two of a set of regular local wordlines in their arrangement order. In other words, the spare local wordlines SWL<0 > and SWL<2> are operable to repair/replace the regular local wordline WL<0+2k> and WL<1+2k>, respectively, where k=0 to N. Similarly, the spare local wordlines pair SWL<1> and SWL<3>, pair SWL<4> and SWL<6> and pair SWL<5> and SWL<7> are also operable to repair/replace the regular local wordline pair WL<0+2k> and WL<1+2k>, respectively, where k=0 to N.

Figure 6:
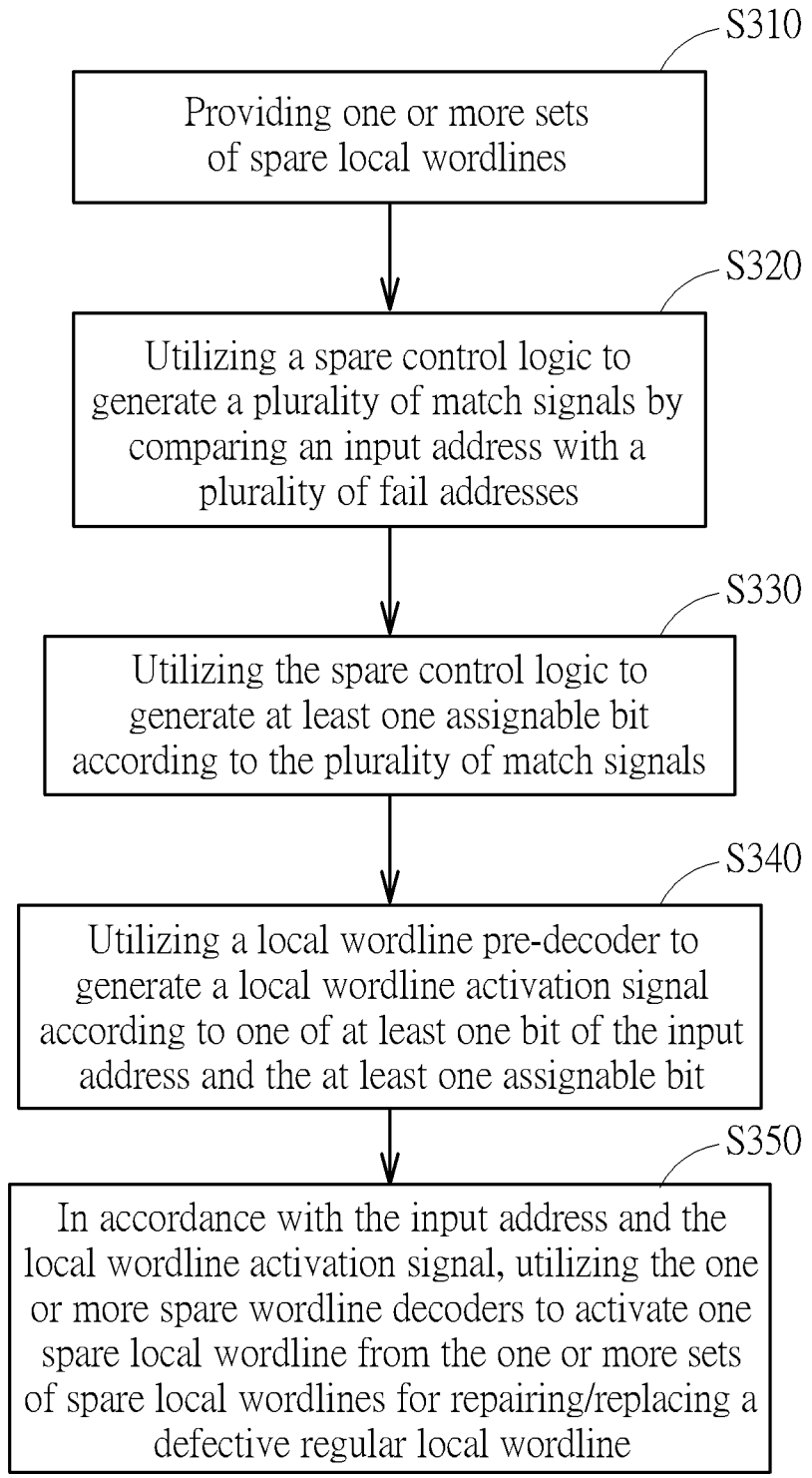
FIG. 6 illustrates a method of handling defective regular local wordlines in a memory module according to one embodiment of the present invention.

FIG. 6 illustrates a method of handling defective wordlines in a memory module according to one embodiment of the present invention. As shown in the figure, the method of the present invention includes the following simplified flow:

Step S310: providing one or more sets of spare local wordlines;

Step S320: utilizing a spare control logic to generate a plurality of match signals by comparing an input address with a plurality of fail addresses;

Step S330: utilizing the spare control logic to generate at least one assignable bit according to the plurality of match signals;

Step S340: utilizing a local wordline pre-decoder to generate a local wordline activation signal according to one of at least one bit of the input address and the at least one assignable bit; and Step S350: in accordance with the input address and the local wordline activation signal, utilizing the one or more spare wordline decoders to activate one spare local wordline from the one or more sets of spare local wordlines for repairing/replacing a defective regular local wordline.

Since principles and specific details of the foregoing steps have been explained in detail through the above embodiments, further descriptions will not be repeated here. It should be noted that the above flow may be possible, by adding other extra steps or making appropriate modifications and adjustments, to better improve flexibility of defective wordlines repairing/replacement.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling defective regular local wordlines in a memory module, comprising:
   providing one or more sets of spare local wordlines;
   utilizing a spare control logic to generate a plurality of match signals by comparing an input address with a plurality of fail addresses;
   utilizing the spare control logic to generate a hit signal and at least one assignable bit according to the plurality of match signals;
   in response to the hit signal, selectively substituting a first portion of the input address with the at least one assignable bit to form a set of internal decoding bits;
   utilizing a local wordline pre-decoder to generate a local wordline activation signal according to the set of internal decoding bits and a second portion of the input address; and
   in accordance with the input address and the local wordline activation signal, utilizing the one or more spare wordline decoders to activate one spare local wordline from the one or more sets of spare local wordlines for repairing/replacing a defective regular local wordline.

2. The method of claim 1, wherein the step of generating the local wordline activation signal omprises:
   providing a plurality of address comparators to compare the plurality of fail addresses with at least one part of the input address, respectively, thereby to generate the plurality of match signals; and
   assigning a value for the at least one assignable bit according to the plurality of match signals.

3. The method of claim 2, wherein the step of generating the at least one assignable bit according to the plurality of match signals comprises:
   assigning values for two assignable bits according to the plurality of match signals; and
   assigning the two assignable bits as (0, 0) in response to a first one of the plurality of match signals being active, assigning the two assignable bits as (0, 1) in response to a second one of the plurality of match signals being active, assigning the two assignable bits as (1, 0) in response to a third one of the plurality of match signals being active and assigning the two assignable bits as (1, 1) in response to a fourth one of the plurality of match signals being active.

4. The method of claim 1, wherein the set of internal decoding bits consists of two assignable bits (B2, B1), and the second portion of the input address is a last bit A0 of the input address; and the step of generating the local wordline activation signal comprises:
   utilizing the local wordline pre-decoder to decode the last bit A0 of the input address and the two assignable bits (B2, B1) in an order of (B2, B1, A0) to generate the local wordline activation signal.

5. The method of claim 4, wherein the step of utilizing one or more spare wordline decoders to selectively activate one or more spare local wordlines from the one or more sets of spare local wordlines respectively comprises:
   activating a first or a second spare local wordline of a set of spare local wordline to repair/replace any one defective regular local wordline that is indicated by a first one of the plurality of fail addresses;
   activating a third or a fourth spare local wordline of the set of spare local wordlines to repair/replace any one defective regular local wordline that is indicated by a second one of the plurality of fail addresses;

activating a fifth or a sixth spare local wordline of the set of spare local wordlines to repair/replace any one defective regular local wordline that is indicated by a third one of the plurality of fail addresses; and activating a seventh or an eighth spare local wordline of the set of spare local wordlines to repair/replace any one defective regular local wordline that is indicated by a fourth one of the plurality of fail addresses.

6. The method of claim 4, wherein the step of utilizing one or more spare wordline decoders to selectively activate one or more spare local wordlines from the one or more sets of spare local wordlines respectively comprises:

activating a first or a second spare local wordline of a set of spare local wordlines to repair/replace a first local wordline or a second local wordline of a first set of regular local wordlines that is indicated by a first one of the fail addresses; and activating a third or a fourth spare local wordline of the set of spare local wordlines to repair/replace a first local wordline or a second local wordline of a second set of regular local wordlines that is indicated by a second one of the fail addresses.

7. The method of claim 1, wherein the set of internal decoding bits consists of two assignable bits (B2, B0), and the second portion of the input address is a last bit A0 of the input address; and the step of generating the local wordline activation signal comprises:

utilizing the local wordline pre-decoder to decode the last bit A0 of the input address and the two assignable bits (B2, B0) in an order of (B2, A0, B0) to generate the local wordline activation signal.

8. The method of claim 7, wherein the step of utilizing one or more spare wordline decoders to selectively activate one or more spare local wordlines from the one or more sets of spare local wordlines respectively comprises:

activating a first or a third spare local wordline of a set of spare local wordlines to repair/replace any one defective regular local wordline that are indicated by a first one of the plurality of fail addresses;

activating a second or a fourth spare local wordline of the set of spare local wordlines to repair/replace any one defective regular local wordline that is indicated by a second one of the plurality of fail addresses;

activating a fifth or a seventh spare local wordline of the set of spare local wordlines to repair/replace any one defective regular local wordline that is indicated by a third one of the plurality of fail addresses; and activating a sixth or an eighth spare local wordline of the set of spare local wordlines to repair/replace any one defective regular local wordline that is indicated by a fourth one of the plurality of fail addresses.

9. The method of claim 7, wherein the step of utilizing one or more spare wordline decoders to selectively activate one or more spare local wordlines from the one or more sets of spare local wordlines respectively comprises:

activating a first or a third spare local wordline of a set of spare local wordlines to repair/replace a first local wordline or a second local wordline of a first set of regular local wordlines that is indicated by a first one of the plurality of fail addresses; and activating a second or a fourth spare local wordline of the set of spare local wordlines to repair/replace a first local wordline or a second local wordline of a second set of regular local wordlines that is indicated by a second one of the plurality of fail addresses.

10. A circuitry for handling defective regular local wordlines in a memory module, comprising:

one or more spare local wordline decoders, configured to control one or more sets of spare local wordlines, each configured to selectively activate one spare local wordline of a corresponding set of spare local wordlines in accordance a local wordline activation signal and an input address, thereby to repair/replace a defective regular local wordline;

a spare control logic, coupled to the one or more spare local wordline decoders, configured to generate a plurality of match signals by comparing the input address with a plurality of fail addresses, and accordingly generate a hit signal and at least one assignable bit according to the plurality of match signals; wherein in response to the hit signal, a first portion of the input address is selectively substituted with the at least one assignable bit to form a set of internal decoding bits; and a local wordline pre-decoder, coupled to the spare control logic, configured to generate the local wordline activation signal according to the set of internal decoding bits and a second portion of the input address.

11. The circuitry of claim 10, wherein the spare control logic comprises:

a plurality of address comparators, configured to compare the plurality of fail addresses with at least one part of the input address, respectively, thereby to generate the plurality of match signals; and a first multiplexer, coupled to the plurality of address comparators, configured to assign a value for the at least one assignable bit according to the plurality of match signals.

12. The circuitry of claim 11, wherein the first multiplexer is configured to assign values for two assignable bits according to the plurality of match signals, wherein the first multiplexer is configured to:

assign the two assignable bits as (0, 0) in response to a first one of the plurality of match signals being active;

assign the two assignable bits as (0, 1) in response to a second one of the plurality of match signals being active;

assign the two assignable bits as (1, 0) in response to a third one of the plurality of match signals being active; and assign the two assignable bits as (1, 1) in response to a fourth one of the plurality of match signals being active.

13. The circuitry of claim 10, wherein the set of internal decoding bits consists of two assignable bits (B2, B1), and the second portion of the input address is a last bit A0 of the input address; and the local wordline pre-decoder is configured to decode the last bit A0 of the input address and the two assignable bits (B2, B1) in an order of (B2, B1, A0) to generate the local wordline activation signal.

14. The circuitry of claim 13, wherein the one or more spare wordline decoders is configured to:

activate a first or a second spare local wordline of a set of spare local wordlines to repair/replace any one defective regular local wordline that is indicated by a first one of the plurality of fail addresses;

activate a third or a fourth spare local wordline of the set of spare local wordlines to repair/replace any one defective regular local wordline that is indicated by a second one of the plurality of fail addresses;

activate a fifth or a sixth spare local wordline of the set of spare local wordlines to repair/replace any one defective regular local wordline that is indicated by a third one of the plurality of fail addresses; and activate a seventh or an eighth spare local wordlines of the set of spare local wordlines to repair/replace any one defective regular local wordline that is indicated by a fourth one of the plurality of fail addresses.

15. The circuitry of claim 13, wherein the one or more spare wordline decoders is configured to:

activate a first or a second spare local wordline of a set of spare local wordlines to repair/replace a first regular local wordline or a second regular local wordline of a first set of regular local wordlines that is indicated by a first one of the plurality of fail addresses; and activate a third one or a fourth one spare local wordlines of the set of spare local wordlines to repair/replace a first regular local wordline or a second regular local wordline of a second set of regular local wordlines that that is indicated by a second one of the plurality of fail addresses.

16. The circuitry of claim 10, wherein the set of internal decoding bits consists of two assignable bits (B2, B0), and the second portion of the input address is a last bit A0 of the input address; and the local wordline pre-decoder is configured to decode the last bit A0 of the input address and the two assignable bits (B2, B0) in an order of (B2, A0, B0) to generate the local wordline activation signal.

17. The circuitry of claim 16, wherein the one or more spare wordline decoders is configured to:

activate a first or a third spare local wordline of a set of spare local wordlines to repair/replace any one defective regular local wordline that is indicated by a first one of the plurality of fail addresses;

activate a second or a fourth spare local wordline of the set of spare local wordlines to repair/replace any one defective regular local wordline that is indicated by a second one of the plurality of fail addresses;

activate a fifth or a seventh spare local wordline of the set of spare local wordlines to repair/replace any one defective regular local wordline that is indicated by a third one of the plurality of fail addresses; and activate a sixth or an eighth spare local wordline of the set of spare local wordlines to repair/replace any one defective regular local wordline that is indicated by a fourth one of the plurality of fail addresses.

18. The circuitry of claim 16, wherein the one or more spare wordline decoders is configured to:

activate a first or a third spare local wordline of a set of spare local wordlines to repair/replace a first local wordline or a second local wordline of a first set of regular local wordlines that is indicated by a first one of the plurality of fail addresses; and activate a second or a fourth spare local wordlines of the set of spare local wordlines to repair/replace a first local wordline or a second local wordline of a second set of regular local wordlines that is indicated by a second one of the plurality of fail addresses.

* * * * *